3,176,016
4,7-DIAMINO-2-MORPHOLINO-6-
PTERIDINECARBOXAMIDES
Thomas S. Osdene, West Chester, Pa., assignor to American Home Products Corporation, New York, N.Y., a corporation of Delaware
No Drawing. Filed Dec. 3, 1962, Ser. No. 241,488
4 Claims. (Cl. 260—247.2)

The present invention relates to novel pteridinecarboxamides and to a process for the production thereof.

More particularly, the present invention makes available novel 4,7-diamino-2-morpholino-6-pteridinecarboxamides.

The preferred novel compounds of this invention are represented by the following general formula:

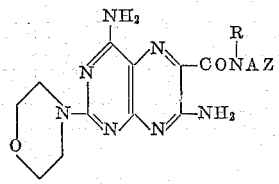

I

In the above formula, R represents hydrogen or a lower alkyl group having from 1 to 4 carbon atoms; AZ may represent hydrogen, while A alone represents a straight chain or a branched alkylene group having from 2 to 5 carbon atoms and Z taken alone represents a di-lower alkylamino radical in which the alkyl radicals may have from 1 to 4 carbon atoms, or, a pyrrolidinyl, piperidinyl, morpholinyl, or piperazinyl radical.

The novel compounds of the present invention suitably are prepared by the process illustrated by the following equation:

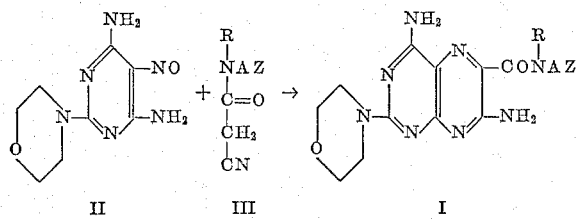

II          III           I

In the above formulas, A, R, X and Z have the same meaning previously set forth.

In practising the process outlined above, the starting 4,6-diamino-2-morpholino-5-nitrosopyrimidine II is heated in an anhydrous neutral polar solvent, preferably in the presence of a catalytic amount of a basic catalyst, with approximately equimolar amounts of cyanoacetamide or a 2-cyano-N-substituted-acetamide III.

Useful neutral polar solvents for this reaction are methanol, propanol, ethanol, butanol, glycol ethers such as 2-methoxy ethanol, 2-ethoxy ethanol, methoxy and ethoxy propanols and amides such as dimethylformamide, diethylformamide and dimethyl acetacide. Suitable basic catalysts for promoting the reaction include the alakli metals, their alkoxides and their alkoxy alkoxides. Preferred among these is sodium methoxide. The reaction temperatures range from about 60° to 200° C. and the reaction is preferably conducted at or near the boiling point of the selected solvent and under autogeneous pressure. The product is purified preferably by dissolving it in aqueous ethanol or dimethyl formamide.

The following examples in which all temperatures are in degrees centigrade, illustrate the best mode of carrying out the invention:

EXAMPLE 1

Thirty-nine grams of 4,6-diamino-2-N-morpholinopyrimidine were dissolved in a mixture of 12 g. of glacial acetic acid and 250 ml. of water. To this solution was added dropwise with stirring and cooling a solution of 14 g. of sodium nitrite in 100 ml. of water. Then, 12 g. of acetic acid were added. The red nitroso compound started to crystallize out and after continuing to stir for 30 minutes, the material was removed by filtration and dried. Wt.=53 g., M.P.=235–6° d. The dried material was recrystallized from ethanol to give 4,6-diamino-2-N-morpholino-5 - nitrosopyrimidine, M.P.=236–237° (decomposition).

Analysis.—Calculated: C=42.85, H=5.39, N=37.48. Found: C=43.03, H=5.41, N=37.20.

EXAMPLE 2

To a solution of 0.8 g. of sodium in 250 ml. of dried 2-ethoxy-ethanol were added 6.7 g. of 4,6-diamino-2-morpholino-5-nitrosopyrimidine and 3.0 g. of cyanoacetamide. The mixture was stirred and boiled under reflux for 30 minutes, during which time a solid was deposited. This solid was removed by filtration and was recrystallized from aqueous dimethylformamide to give 4,7-diamino-2-morpholino-6-pteridinecarboxamide, M.P.>360°.

Analysis.—Calculated: C=45.51, H=4.87, N=36.60. Found: C=45.66, H=5.22, N=38.68.

EXAMPLE 3

To a solution of 0.8 g. of sodium in 400 ml. of dried 2-ethoxyethanol were added 6.4 g. of 4,6-diamino-2-morpholino-5-nitrosopyrimidine followed by 5.6 g. of 2-cyano-N-(3 - dimethylaminopropyl) acetamide. The mixture was stirred and boiled under reflux for 2 hours. The hot solution was filtered while still hot, and the filtrate was concentrated to a smaller volume. On standing overnight a solid deposited, which was treated with 150 ml. of cold water and removed by filtration, M.P. 237°. Recrystallization from aqueous ethanol afforded 4,7-diamino-N-(3-dimethylaminopropyl)-2-morpholino-6 - pteridine carboxamide, M.P. 241°.

Analysis.—Calculated: C=51.18, H=6.71, N=33.58. Found: C=50.75, H=7.06, N=33.63.

EXAMPLE 4

To a solution of 6.7 g. of 4,6-diamino-2-morpholino-5-nitrosopyrimidine in 200 ml. of dry dimethylformamide were added 5.58 g. of 2-cyano-N-(methyl-2-dimethylaminoethyl)acetamide, and 1.78 g. of sodium methoxide. The mixture was stirred mechanically and boiled under reflux for 1 hour. The mixture was filtered and cooled, and on scratching 1.2 g. of yellow material, M.P. 244° (decomposition) was obtained. Concentration of the mother liquor afforded a further 5.3 g. of material, M.P. 242° (decomposition). Recrystallization from 2-ethoxy-ethanol afforded 4,7-diamino-N-2-dimethylaminoethyl)-N-methyl-2-morpholino-6 - pteridinecarboxamide, M.P. 245°.

Analysis.—Calculated: C=51.18, H=6.71, N=33.58. Found: C=51.08, H=6.67, N=33.52.

By the same procedure, 4,6-diamino-2-morpholino-5-nitrosopyrimidine is reacted with the cyanoacetamides listed below, affording the corresponding products hereinafter stated:

| Starting Compounds | Products |
|---|---|
| 2-cyano-N-(2-morpholinoethyl) acetamide. | 4,7-diamino-N-(2-morpholinoethyl)-2-morpholino-6-pteridinecarboxamide. |
| 2-cyano-N-(2-diethyl aminoethyl) acetamide. | 4,7-diamino-N-(2-diethylaminoethyl)-2-morpholino-6-pteridinecarboxamide. |
| 2-cyano-N-(2-di-isopropyl aminoethyl) acetamide. | 4,7-diamino-N-(2-di-isopropyl aminoethyl)-2-morpholino-6-pteridinecarboxamide. |
| 2-cyano-N-(ethyl) acetamide. | 4,7-diamino-N-(ethyl)-2-morpholino-6-pteridinecarboxamide. |
| 2-cyano-N-(5-diethyl aminopentyl) acetamide. | 4,7-diamino-N-(5-diethyl-aminopentyl)-2-morpholino-6-pteridinecarboxamide. |
| 2-cyano-N-(methyl-2-piperidinoethyl) acetamide. | 4,7-diamino-N-(2-piperidinoethyl)-N-methyl-2-morpholino-6-pteridinecarboxamide. |
| 2-cyano-N-(butyl-5-dibutyl-aminopentyl) acetamide. | 4,7-diamino-N-(5-dibutylaminopentyl)-N-butyl-2-morpholino-6-pteridinecarboxamide. |
| 2-cyano-N-(propyl-2-pyrrolidinoethyl) acetamide. | 4,7-diamino-N-(2-pyrrolidinoethyl)-N-propyl-2-morpholino-6-pteridinecarboxamide. |

The novel compounds of this invention exhibit antiviral, diuretic, and anti-inflammatory properties.

The novel compounds of Formula I can be administered in a wide variety of oral or parenteral forms, alone, or in admixture with other active compounds. They can be associated with a pharmaceutical carrier which can be a solid or a liquid in which the compound is dissolved or suspended. The solid compositions can take the form of tablets, powders, capsules or pills. The liquid compositions can take the form of solutions, syrups, or emulsions.

What is claimed is:

1. A compound of the formula:

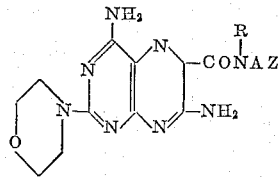

wherein R is selected from the group consisting of hydrogen and lower alkyl having from 1 to 4 carbon atoms, A is an alkylene group having from 2 to 5 carbon atoms, Z is selected from the group consisting of di-(lower)alkylamino, morpholino, piperidino, pyrrolidino and piperazino and AZ taken together represent hydrogen.

2. 4,7-diamino-2-morpholino-6-pteridinecarboxamide.

3. 4,7-diamino-N-(3-dimethylaminopropyl)-2-morpholino-6-pteridinecarboxamide.

4. 4,7-diamino-N-(2-dimethylaminoethyl)-N-methyl 2-morpholino-6-pteridinecarboxamide.

References Cited in the file of this patent

UNITED STATES PATENTS

| 2,963,478 | Weinstock | Dec. 6, 1960 |
| 3,028,387 | Weinstock | Apr. 3, 1962 |

UNITED STATES PATENT OFFICE
CERTIFICATE OF CORRECTION

Patent No. 3,176,016                                        March 30, 1965

Thomas S. Osdene

It is hereby certified that error appears in the above numbered patent requiring correction and that the said Letters Patent should read as corrected below.

Column 1, line 58, for "acetacide" read -- acetamide --; line 59, for "alakli" read -- alkali --; column 2, lines 6 and 7, for "morpholinoprimidine" read -- morpholinopyrimidine --; line 61, for "-2-dimethylaminoethyl)-" read -- -(2-dimethylaminoethyl)- --; column 4, lines 6 to 13, the formula should appear as shown below instead of as in the patent:

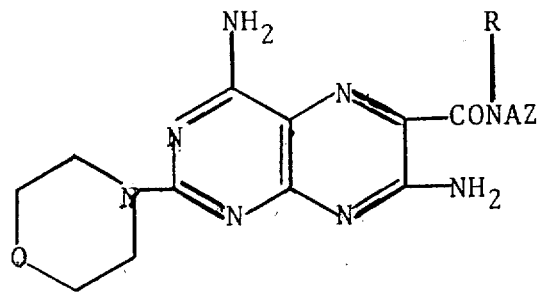

same column 4, line 23, for "-methyl 2-" read ---methyl-2- --.

Signed and sealed this 28th day of September 1965.

(SEAL)
Attest:

ERNEST W. SWIDER                                EDWARD J. BRENNER
Attesting Officer                               Commissioner of Patents